US006669991B2

(12) United States Patent
Stuart

(10) Patent No.: US 6,669,991 B2
(45) Date of Patent: Dec. 30, 2003

(54) METHOD AND COMPOSITION FOR REJUVENATING WEATHERED POLYMERIC MATERIALS

(76) Inventor: Alan Stuart, 4927 State Route 151, Mingo Junction, OH (US) 43938

( * ) Notice: Subject to any disclaimer, the term of this patent is extended or adjusted under 35 U.S.C. 154(b) by 0 days.

(21) Appl. No.: 10/102,714

(22) Filed: Mar. 22, 2002

(65) Prior Publication Data

US 2003/0180452 A1 Sep. 25, 2003

(51) Int. Cl.⁷ .................................................. B05D 3/02
(52) U.S. Cl. ......................................................... 427/384
(58) Field of Search ................................. 427/384, 429

(56) References Cited

U.S. PATENT DOCUMENTS

| | | | | |
|---|---|---|---|---|
| 4,317,755 A | 3/1982 | Gregory | ...................... | 524/276 |
| 4,619,957 A | 10/1986 | Reid et al. | ...................... | 524/91 |
| 5,041,235 A | 8/1991 | Kilbarger | ...................... | 252/170 |
| 5,049,314 A | * 9/1991 | Short | ...................... | 510/212 |
| 5,217,640 A | * 6/1993 | Narayanan et al. | .......... | 510/201 |
| 5,332,526 A | * 7/1994 | Stanley | ...................... | 510/212 |
| 5,376,296 A | 12/1994 | Dutcher | ...................... | 252/102 |
| 5,605,578 A | 2/1997 | Hawes et al. | ................... | 134/36 |
| 5,916,861 A | * 6/1999 | Lyssy | ........................ | 510/213 |
| 5,955,521 A | 9/1999 | Rufus et al. | ................. | 524/102 |
| 6,121,221 A | * 9/2000 | Davis | ........................ | 510/244 |
| 6,159,915 A | * 12/2000 | Machac et al. | ............. | 510/201 |
| 6,245,728 B1 | 6/2001 | Robbins et al. | ............. | 510/238 |
| 6,271,191 B1 | 8/2001 | Kerobo et al. | .............. | 510/475 |

FOREIGN PATENT DOCUMENTS

| | | | |
|---|---|---|---|
| JP | 48-010142 | * | 2/1973 |
| JP | 03-284651 | * | 12/1991 |

OTHER PUBLICATIONS

Boysen, Plastverarbeiter, 34(10), pp. 1179–1180 and 1182–1183, 1983.*

* cited by examiner

*Primary Examiner*—Erma Cameron
(74) *Attorney, Agent, or Firm*—Renner, Kenner, Greive, Bobak, Taylor & Weber

(57) ABSTRACT

A method for rejuvenating a vinyl resin surface, the method comprising applying a composition to the surface, where the composition includes at least one organic solvent compound that has a solubility parameter ($\delta$) of from about 8.0 to about 10.6 $(cal/cm^3)^{1/2}$.

24 Claims, No Drawings

METHOD AND COMPOSITION FOR REJUVENATING WEATHERED POLYMERIC MATERIALS

TECHNICAL FIELD

This invention relates to a composition and method for rejuvenating polymeric materials, especially those comprised of vinyl resins such as vinyl siding.

BACKGROUND OF THE INVENTION

Vinyl resins, such as poly(vinyl chloride), and vinyl chloride copolymers are useful for a variety of products such as siding, windows, door panels, fences, decks, pipes and cables, and automobile parts. These resins, however, are susceptible to deterioration by heat, weathering or ultraviolet light. Ultraviolet light causes these resins to discolor, chalk, loose gloss, and even to become brittle leading to possible deformation of the product made from the vinyl resin.

Attempts at solving this problem have been made. For example, ultraviolet light stabilizers have been added to the polymeric compositions that are used to prepare the products. The addition of these stabilizers, however, has not proven to be entirely satisfactory. To begin with, the addition of these stabilizers increases product and manufacturing costs. Further, many stabilizers have not provided sufficient ultraviolet protection and therefore the problems of ultraviolet degradation persist. Further, this approach is proactive and therefore provides no benefit or assistance once the degradation occurs.

Also, where polymeric materials, such as vinyl resins, are employed to make products that are subjected to continuous environmental exposure, such as in the case of vinyl siding, the products suffer from the build-up of mold, mildew, algae, grease, and stains from various environmental sources. Conventional approaches to cleaning these surfaces typically include the use of water and common household detergents. In some instances, expensive high-pressure power washers are employed for this purpose. Other approaches include the use of bleach or other chlorine-based materials. Besides the fact that these approaches do not always provide satisfactory results, they can be labor intensive and expensive. Furthermore, if the deterioration of the surface is such that the surface loses its smooth appearance, these methods can not correct that change and in fact often make the situation worse.

Because there are numerous products made from polymeric materials, including vinyl resins, plastics and rubbers, and these products continue to suffer from attack by heat, ultraviolet light or other environmental exposure, a need remains to rejuvenate the surfaces of these products.

SUMMARY OF INVENTION

In general the present invention provides a method for rejuvenating a vinyl resin surface, the method comprising applying a composition to the surface, where the composition includes at least one organic solvent compound that has a solubility parameter ($\delta$) of from about 8.0 to about 10.6 $(cal/cm^3)^{1/2}$.

The present invention also includes a method for rejuvenating the surface of vinyl siding, the method comprising applying a composition to the surface of the vinyl siding, where the composition comprises from about 20 to about 90 percent by weight of an organic solvent component that is an ether, a heterocyclic ether, an aldehyde, a ketone, an ester, a chlorinated hydrocarbon, an amide, a cyclic amide, a compound that is both an ether and an ester, or a mixture thereof.

The present invention further includes a composition for rejuvenating and cleaning the surface of weathered vinyl siding, the composition comprising applying a composition to the surface of the vinyl siding, where the composition comprises from about 20 to about 90 percent by weight of an organic solvent component that is an ether, a heterocyclic ether, an aldehyde, a ketone, an ester, a chlorinated hydrocarbon, an amide, a cyclic amide, a compound that is both an ether and an ester, or a mixture thereof.

The present invention also includes a method for rejuvenating a weathered polymeric surface, the method comprising applying a composition to the weathered surface where the composition includes at least one organic solvent having a solubility parameter ($\delta$) within about 1.8 $(cal/cm^3)^{1/2}$ of the solubility parameter of the polymeric surface.

The composition and method of this invention advantageously removes or transforms the chalky surface that develops on polymeric surfaces that are exposed to sunlight and other environmental conditions. Additionally, the color, luster, and gloss of the surface can be restored. When the composition of this invention is employed according to the methods of the invention, rejuvenating the surface of a polymeric product requires only minimal labor, minimal preparation time, and minimal dry time. The composition and method of this invention also advantageously remove dirt, mold, mildew, and other biogrowths from the surfaces of polymeric products. Although the preferred methods for using the composition of this invention include rejuvenating vinyl products, especially vinyl siding, the methods and composition of this invention can be extended to rejuvenate other polymeric surfaces including both plastic and rubber surfaces.

PREFERRED EMBODIMENT FOR CARRYING OUT THE INVENTION

Vinyl siding and other weathered polymeric materials can be rejuvenated by applying a particular composition of matter to the surface of the siding or material. The composition includes at least one organic solvent compound that has a solubility parameter ($\delta$) that is matched to the solubility parameter of the polymeric surface to be rejuvenated.

Solubility parameter is a term known in the art as discussed in the Kirk-Othmer, Encyclopedia of Chemical Technology, Second Addition, Supplement at pp. 899–910 (1971), Rosen, *Polymer Solubility and Solutions*, Fundamental Principles of Polymeric Materials, pp. 74–87 (1982), and Grulke, *Solubility Parameter Values*, Polymer Handbook, Third Edition, pp. VII/519–VII/559 (1989), which are incorporated herein by reference. Solubility parameter has been defined as the square root of the energy of vaporization per cubic centimeter of a solvent. Thus, $\delta=[(\Delta E_V)/(V)]^{1/2}$; where $\Delta E_V$ is energy of vaporization and V is molar volume. Solubility parameter is also expressed as $\delta^2 = \delta_D^2 + \delta_E^2 + \delta_H^2$ where $\delta_D$ is the dispersion component of the solubility parameter; $\delta_E$ is the polar component of the solubility parameter; and $\delta_H$ is the hydrogen bonding component of the solubility parameter. These parameters are available for a large number of solvents as set forth in Table I on pages 892–896 of the Kirk-Othmer text, and pages 525–539 of the Grulke text.

Where vinyl siding is treated according to this invention, the composition should include at least one organic solvent compound that has a solubility parameter ($\delta$) of from about 8.0 to about 10.6 $(cal/cm^3)^{1/2}$, more preferably from about 8.3. to 10.4 $(cal/cm^3)^{1/2}$, more preferably from about 8.7 to about 10.2 $(cal/cm^3)^{1/2}$, still more preferably from about 8.9 to about 10.0 $(cal/cm^3)^{1/2}$, and still more preferably from about 9.1 to about 9.9 $(cal/cm^3)^{1/2}$.

Organic solvent compounds with the foregoing solubility parameters are selected because their solubility parameters are matched to the solubility parameters of the poly(vinyl chloride) and other vinyl copolymers that are used in the manufacture of vinyl siding. Namely, the solubility parameter of poly(vinyl chloride) is about 9.4 to about 9.8 $(cal/cm^3)^{1/2}$. The term "matched," as used herein with respect to solubility parameters, refers to a solvent solubility parameter that is within 1.8 $(cal/cm^3)^{1/2}$, preferably within 1.5 $(cal/cm^3)^{1/2}$, more preferably within 1.2 $(cal/cm^3)^{1/2}$, and even more preferably within 1.0 $(cal/cm^3)^{1/2}$ of the solubility parameter of the polymeric surface to be treated. Where polymers other than vinyl resins are targeted for cleaning and rejuvenation, those skilled in the art will be able to select an appropriate solvent in accordance with the teachings of this invention once the solubility of the polymeric surface is determined.

The use of a solvent that is matched to the solubility parameter of the target polymer within the article to be rejuvenated or cleaned has led to unexpected advantages inasmuch as conventional wisdom suggests that the use of a matched solvent would lead to the destruction, via solubilization, of the surface to be cleaned or rejuvenated. Moreover, the fact that the composition of this invention restores the original luster of the surface, especially the surfaces of vinyl siding, was highly unexpected since conventional wisdom suggests that a solvent would remove and thereby deteriorate the luster of the surface.

In one embodiment, the composition for treating vinyl surfaces preferably includes from about 5 to about 100 percent by weight of the organic solvent having the matched solubility parameter. More preferably, the composition includes from about 20 to about 90, more preferably from about 30 to about 80, and even more preferably from about 50 to about 70 percent by weight of the organic solvent having the matched solubility parameter.

The term "organic solvent compound" refers to those organic materials that are liquid at room temperature and standard pressure and evaporate in within a reasonable time. For example, a thin layer of most organic solvent compounds will substantially evaporate within about 1 hour under ambient conditions. Preferably, solvent compounds employed in this invention will substantially evaporate within 0.5 hour, more preferably within 0.3 hour, and even more preferably within 0.2 hour. Compounds having a reasonable evaporation rate are preferred because the surface being treated could be clouded by dust or debris that could collect on the solvated surface while the solvent is evaporating. Reference to organic solvent compound will include, but is not limited to, mixtures of one or more organic solvent compounds.

These compounds include linear aliphatic compounds, cyclic aliphatic compounds, aromatic compounds, heterocyclic compounds, and halogenated hydrocarbons. Examples of types of linear aliphatic compounds include hydrocarbons, long-chain alcohols, ethers, aldehydes, ketones, amides, and esters, as well as halogenated versions of these compounds. Examples of types of cyclic aliphatic compounds include cyclic hydrocarbons including those that contain pendant ether, aldehyde, ketone, amide, and ester substituents extending from the ring. Examples of types of aromatic compounds include benzene, substituted benzene, biphenyls, substituted biphenyls, halogenated benzenes, halogenated biphenyls, and aromatic compounds containing pendant ether, aldehyde, ketone, amide, and ester substituents extending from the ring. Examples of types of heterocyclic compounds include those ring structures that include oxygen, nitrogen, or sulfur within the ring.

While the solubility parameter of the organic solvent compound serves to define the compounds that are useful in practicing this invention, especially desirous results are obtained when the matched solvent compound or compounds that are used to rejuvenate vinyl surfaces have some degree of polarity. Polar compounds include those organic compounds that have a dipole moment. Examples of preferred compounds that have some degree of polarity include ethers, including heterocyclic ethers, aldehydes, ketones, esters, chlorinated hydrocarbons, amides including cyclic amides, those compounds that include more than one of these substituents, or a mixture thereof.

Examples of ethers include dimethoxyethane, tetrahydrofuran, furfural, and furan. Examples of aldehydes include acetaldehyde, benzaldehyde, and cyclopentanecarboxaldehyde. Examples of ketones include ethyl propyl ketone, methyl ethyl ketone, acetone, acetophenone, benzophenone, and benzyl ethyl ketone. Examples of esters include ethyl acetate methyl propanoate, and chloroethyl benzoate. Examples of chlorinated hydrocarbons include trichloroethylene, methylene chloride and chloroform. Examples of compounds that include more than one preferred functionality include ethyl 3-ethoxypropionate and ethylene glycol monobutyl ether acetate. Preferred amides include those without an NH bond such as n-methylpyrrolidone and dimethylacetamide. Mixtures of the foregoing may also be employed.

In addition to the matched organic solvent, the composition of this invention may optionally include other ingredients including, but not limited to, diluents, thinners, antioxidants, thermal stabilizers, bacteriostats, and ultraviolet absorbers. Many of these additional additives are disclosed in Titow, PVC Technology, Fourth Addition, chapters 5, 6, 9, and 10 (1984), which is incorporated herein by reference.

Preferred diluents and thinners include those organic solvents that are not matched, i.e., do not have a solubility parameter between 8.0 and 10.6, or are not otherwise good solvents for the target polymer, but yet can be used to reduce the overall cost of the composition, change the overall vapor pressure of the composition, make the composition easier to apply, adjust the drying time of the composition, i.e., the rate of evaporation, make the composition safer to apply, and reduce the potency of the matched solvent to interact with the polymeric surface. Preferred diluents include aliphatic solvents, especially blends of aliphatic including from about 4 to about 10 carbon atoms, aromatic solvents, especially blends of aromatic compounds having from about 6 to about 16 carbon atoms, and naphtha. Other compounds that can be used in addition to the matched solvent include those materials that likewise have a matched solubility parameter to the polymeric surface but do not quickly evaporate. For example, where a quick-dry time is not required or desired, pine oil or tricresyl phosphate could be added to those compositions for rejuvenating the surface of vinyl resins.

In one embodiment of this invention, where the composition is especially useful for rejuvenating vinyl siding, the composition includes from about 35 to about 65 percent by weight of an organic solvent compound having a solubility parameter (δ) of from about 8.9 to about 10.6, with the balance of the composition including diluents and other ingredients as described above. Preferably, the organic solvent compound will include one or more compounds selected from ethers, ketones, or esters. In a particularly preferred embodiment, these compounds include ethyl 3-ethoxypropionate, ethylene glycol monobutyl ether acetate, and acetone.

Where aliphatic and aromatic distillates are employed as the diluent, the diluent mixture will preferably include from about 40 to about 80 percent by weight of an aliphatic compounds and from about 20 to about 60 percent by weight of an aromatic compounds, based on the total weight of the diluent. More preferably, the diluent mixture will include from about 50 to about 70 percent by weight of an aliphatic compounds and from about 30 to about 50 percent by weight of an aromatic compounds, based on the total weight of the diluent.

The most preferred composition for cleaning and rejuvenating vinyl surfaces includes from about 28 to about 32 percent by weight ethyl 3-ethoxypropionate, from about 11 to about 15 percent by weight butyl acetate, from about 11 to about 13 percent by weight toluene, from about 8 to about 12 percent by weight ethylene glycol monobutyl ether acetate, from about 5 to about 9 percent by weight acetone, from about 3 to about 4 percent by weight 1,2,4-trimethylbenzene, from about 1 to about 3 percent by weight 1,3,5-trimethylbenzene, from about 16 to about 20 percent by weight aliphatic petroleum distillates, and from about 8 to about 12 percent by weight aromatic petroleum distillates.

Where the composition employed in practicing the present invention includes two or more organic solvents or other ingredients in addition to the matched organic solvent, the composition can be prepared by employing conventional techniques for blending organic solvents or dissolving various additives within organic solvents.

The composition employed in the present invention can be applied to the surface being treated at ambient temperatures and pressure. Inasmuch as the compositions of this invention are preferably applied to weathered surfaces, the composition may be applied at various temperatures depending on the environment. The preferred application temperature is from about 0° C. to about 30° C. and more preferably from about 10° C. to about 22° C. Where the application temperature is extremely cold, the diluents and thinners employed can be selected to alter the evaporation rate of the composition so as to be more conducive to the colder temperatures.

In most situations, the composition can simply be applied by wetting or saturating a cloth and wiping the weathered surface. This application can also take place with a sponge or similar device such as those commonly employed in applying cleaners, protectants, stains, or varnishes to various surfaces. Preferably, the cloth or sponge should be non-stained or dyed so that any color within the cloth or sponge does not transfer to the surface being treated. Also, the cloth or sponge should be non-reactive with the composition. During this method of application, some of the chalky surface of the vinyl siding may be removed on the cloth, but it should be appreciated that this removal is not required to achieve the benefits of rejuvenation. In other words, it has been found that the rejuvenation, e.g., restoration of color and luster, does not necessarily result from cleaning the surface. Instead, the restoration or rejuvenation is believed to result from a replasticizing of the vinyl surface. A residual benefit of the invention is the fact that debris other than the chalky surface can be removed, i.e., cleaned. In other embodiments, the composition can be sprayed or rolled onto the surface to be treated. Again, these techniques are useful because the chalky surface does not need to removed from the surface.

In preferred embodiments, where vinyl siding is treated, the preferred method of application is to wet or saturate a sponge or cloth and wipe the vinyl siding by way of a single pass. Because vinyl siding typically includes planks or sections that are from about 4 to about 8 inches in height, the rate of application the composition is typically about 50 to about 80 board feet per minute and dvantageously about 60 to about 70 board feet per minute.

In order to demonstrate the practice of the present invention, the following examples have been prepared and tested. The examples should not, however, be viewed as limiting the scope of the invention. The claims will serve to define the invention.

GENERAL EXPERIMENTATION

A composition was prepared by blending various organic solvents in the amounts set forth in Table I.

TABLE I

| Ingredient (% by volume) | |
| --- | --- |
| Ethyl 3-Ethoxypropionate | 28.0–32.0 |
| Aliphatic Petroleum Distillates | 16.0–20.0 |
| Butyl Acetate | 11.0–15.0 |
| Toluene | 12.0–12.0 |
| Aromatic Petroleum Distillates | 8.0–12.0 |
| Ethylene Glycol Monobutyl Ether Acetate | 8.0–12.0 |
| Acetone | 5.0–9.0 |
| 1,2,4-Trimethylbenzene | 3.6–3.6 |
| 1,3,5-Trimethylbenzene | 1.0–2.9 |

The effectiveness of the composition was tested by spot-applying the composition to the sides of various homes that had vinyl siding that had been subjected to heat, sunlight, and weather over a variety of years.

The composition was applied by saturating a white cloth with a composition and applying it to the surface of the vinyl siding by wiping the saturated cloth across the vinyl siding with a single pass at moderate pressure. In each test application of the composition, the luster of the vinyl siding, including the disappearance of any chalky surface, was restored immediately. Also, there was a significant color change that was evident to the naked eye.

In order to establish the degree to which the original color of the vinyl siding had been restored, a colorimeter test was performed by using a X-RITE calorimeter. The testing was conducted on the north side of a home that had ALSCO DOUBLE 5™ (Alsco, Inc.) siding that was beige in color. This siding was about nine years old at the time of testing, and it had been spot-treated about two months prior to the colorimeter test. The original color of the siding was determined by selecting a piece of siding that had been protected from sunlight; e.g., siding that was under a corner strip. This protected piece of siding was removed from the house and the back surface of the protected area of the siding was analyzed. The results of this testing established the standard or base line of 70.87 Delta E.

Untreated siding, which was proximate to and on the same side of the respective houses as the spot treated area, was then analyzed and determined to have a 74.79 Delta E. Finally, the spot-treated areas were analyzed and determined to have a 71.79 Delta E.

The results of the colorimeter tests indicated that by treating the weathered vinyl siding in accordance with this invention, the original color of the vinyl siding was restored within 1 Delta E (0.92 Delta E). It is noted that most vinyl siding manufacturers regulate their quality assurance within 1 Delta E, and therefore the restoration and color provided by practicing this invention is tantamount to the color differentiation of new product. Also, a difference of less than 1 Delta E is not noticeable to the human eye.

While the best mode and preferred embodiment of the invention have been set forth in accord with the Patent Statues, the scope of this invention is not limited thereto, but rather is defined by the attached claims. Thus, the scope of the invention includes all modifications and variations that may fall within the scope of the claims.

What is claimed is:

1. A method for rejuvenating the surface of vinyl siding, the method comprising:
    applying a composition to the surface of the vinyl siding, where the composition consists essentially of one or more organic solvent compounds that have a solubility parameter ($\delta$) of from about 8.0 to about 10.6 $(cal/cm^3)^{1/2}$, optionally one or more diluents selected from the group consisting of aliphatic distillates, aromatic distillates, naphtha, pine oil, tricresyl phosphate, and mixtures thereof, and optionally one or more antioxidants, thermal stabilizers, bacteriostats, ultraviolet absorbers, and a mixture thereof.

2. The method of claim 1, where the organic solvent compound is a polar compound.

3. The method of claim 1, where the organic solvent compound is selected from the group consisting of an ether, a heterocyclic ether, an aldehyde, a ketone, an ester, a chlorinated hydrocarbon, an amide, a cyclic amide, a compound that is both an ether and an ester, and a mixture thereof.

4. The method of claim 1, where the organic solvent compound is selected from the group consisting of dimethoxyethane, tetrahydrofuran, ethyl acetate, methyl ethyl ketone, acetone, acetophenone, methylene chloride, chloroform, ethyl 3-ethoxypropionate, ethylene glycol monobutyl ether acetate, and a mixture thereof.

5. The method of claim 1, where the organic solvent compound has a solubility parameter ($\delta$) of from about 8.3 to about 10.4 $(cal/cm^3)^{1/2}$.

6. The method of claim 1, where the organic solvent compound has a solubility parameter ($\delta$) of from about 8.7 to about 10.2 $(cal/cm^3)^{1/2}$.

7. The method of claim 1, where the organic solvent compound has a solubility parameter ($\delta$) of from about 8.9 to about 10.0 $(cal/cm^3)^{1/2}$.

8. The method of claim 1, where the composition includes from about 50 to about 100 percent by weight of the one or more organic solvent compounds that have a solubility parameter ($\delta$) of from about 8.0 to about 10.6 $(cal/cm^3)^{1/2}$.

9. The method of claim 3, where the composition includes from about 50 to about 100 percent by weight of one or more organic solvent compounds that have a solubility parameter ($\delta$) of from about 8.0 to about 10.6 $(cal/cm^3)^{1/2}$.

10. The method of claim 4, where the composition includes from about 50 to about 100 percent by weight of one or more organic solvent compounds that have a solubility parameter ($\delta$) of from about 8.0 to about 10.6 $(cal/cm^3)^{1/2}$.

11. The method of claim 1, where said step of applying includes wiping the surface with a cloth or sponge.

12. The method of claim 1, where the diluent is a mixture consisting essentially of from about 40 to about 80 percent by weight of an aliphatic compounds and from about 20 to about 60 percent by weight of an aromatic compounds, based on the total weight of the diluent.

13. The method of claim 1, where the organic solvent compound is selected from the group consisting of ethyl 3-ethoxypropionate, ethylene glycol monobutyl ether acetate, and acetone.

14. The method of claim 1, wherein the vinyl surface comprises poly(vinylchloride) or a vinyl chloride copolymer having a solubility parameter of from about 9.4 to about 9.8 $(cal/cm^3)^{1/2}$.

15. A method for rejuvenating the surface of vinyl siding, the method comprising;
    applying a composition to the surface of the vinyl siding, where the composition comprises from about 28 to about 32 percent by weight ethyl 3-ethoxypropionate, from about 11 to about 15 percent by weight butyl acetate, from about 11 to about 13 percent by weight toluene, from about 8 to about 12 percent by weight ethylene glycol monobutyl ether acetate, from about 5 to about 9 percent by weight acetone, from about 3 to about 4 percent by weight 1,2,4-trimethylbenzene, from about 1 to about 3 percent by weight 1,3,5-trimethylbenzene, from about 16 to about 20 percent by weight aliphatic petroleum distillates, and from about 8 to about 12 percent by weight aromatic petroleum distillates.

16. The method of claim 15, where the composition further includes antioxidants, thermal stabilizers, bacteriostats, ultraviolet absorbers, or a mixture thereof.

17. The method of claim 15, where said step of applying includes wiping the surface with a cloth or sponge.

18. The method of claim 15, where the composition consists essentially of from about 28 to about 32 percent by weight ethyl 3-ethoxypropionate, from about 11 to about 15 percent by weight butyl acetate, from about 11 to about 13 percent by weight toluene, from about 8 to about 12 percent by weight ethylene glycol monobutyl ether acetate, from about 5 to about 9 percent by weight acetone, from about 3 to about 4 percent by weight 1,2,4-trimethylbenzene, from about 1 to about 3 percent by weight 1,3,5-trimethylbenzene, from about 16 to about 20 percent by weight aliphatic petroleum distillates, and from about 8 to about 12 percent by weight aromatic petroleum distillates.

19. The method of claim 15, wherein the vinyl surface comprises poly(vinylchloride) or a vinyl chloride copolymer having a solubility parameter of from about 9.4 to about 9.8 $(cal/cm^3)^{1/2}$.

20. A method for rejuvenating and cleaning the surface of weathered vinyl siding, the composition comprising:
    applying a composition to the surface of the vinyl siding, where the composition comprises from about 50 to about 100 percent by weight of an organic solvent component that is an ether, a heterocyclic ether, an aldehyde, a ketone, an ester, a chlorinated hydrocarbon, an amide, a cyclic amide, a compound that is both an ether and an ester, or a mixture thereof, where the organic solvent component has a solubility parameter ($\delta$) of from about 8.0 to about 10.6 $(cal/cm^3)^{1/2}$.

21. The method of claim 20 wherein the vinyl surface comprises poly(vinylchloride) or a vinyl chloride copolymer having a solubility parameter of from about 9.4 to about 9.8$(cal/cm^3)^{1/2}$.

22. A method for rejuvenating the surface of vinyl siding, the method comprising;
    applying a composition to the surface of vinyl siding, where the vinyl siding includes poly(vinylchoride) or other vinyl copolymers that are characterized by having a solubility parameter of from about 9.4 to about 9.8 $(cal/cm^3)^{1/2}$, where the composition includes at least 50 percent by weight of one or more organic solvent compounds that have a solubility parameter of from about 8.0 to about 10.6 $(cal/cm^3)^{1/2}$.

23. The method of claim 22, where the one or more organic solvent compounds include ethyl 3-ethoxypropionate, ethylene glycol monobutyl ether acetate, and acetone.

24. The method of claim 22, wherein the vinyl surface comprises poly(vinylchloride) or a vinyl chloride copolymer having a solubility parameter of from about 9.4 to about 9.8 $(cal/cm^3)^{1/2}$.

* * * * *